United States Patent
Jensen et al.

(10) Patent No.: US 9,363,312 B2
(45) Date of Patent: Jun. 7, 2016

(54) TRANSPARENT HEADER MODIFICATION FOR REDUCING SERVING LOAD BASED ON CURRENT AND PROJECTED USAGE

(75) Inventors: Brian W. Jensen, Raleigh, NC (US); Mauro Marzorati, Lutz, FL (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 12/845,303

(22) Filed: Jul. 28, 2010

(65) Prior Publication Data

US 2012/0030341 A1 Feb. 2, 2012

(51) Int. Cl.
  *G06F 15/16* (2006.01)
  *H04L 29/08* (2006.01)
  *H04L 29/06* (2006.01)

(52) U.S. Cl.
  CPC ........ *H04L 67/1008* (2013.01); *H04L 67/1029* (2013.01); *H04L 67/2804* (2013.01); *H04L 67/322* (2013.01); *H04L 69/22* (2013.01); *H04L 67/02* (2013.01)

(58) Field of Classification Search
  CPC . H04L 67/02; H04L 67/1008; H04L 67/1029; H04L 67/2804; H04L 67/322; H04L 69/22
  USPC .......................................................... 709/224
  See application file for complete search history.

(56) References Cited

U.S. PATENT DOCUMENTS

| | | | |
|---|---|---|---|
| 6,243,761 B1 | 6/2001 | Mogul et al. | |
| 6,839,700 B2 | 1/2005 | Doyle et al. | |
| 7,124,188 B2 | 10/2006 | Mangipudi et al. | |
| 7,222,177 B2 | 5/2007 | Johnson | |
| 7,281,045 B2 * | 10/2007 | Aggarwal et al. | 709/226 |
| 7,346,676 B1 | 3/2008 | Swildens et al. | |
| 7,373,644 B2 | 5/2008 | Aborn | |
| 7,386,611 B2 | 6/2008 | Dias et al. | |
| 7,451,226 B1 | 11/2008 | Goldszmidt et al. | |
| 7,502,834 B2 | 3/2009 | Ehrich et al. | |
| 8,200,837 B1 * | 6/2012 | Bhatti et al. | 709/232 |
| 2002/0194251 A1 | 12/2002 | Richter et al. | |
| 2006/0047779 A1 * | 3/2006 | Deshpande | 709/218 |

(Continued)

OTHER PUBLICATIONS

Pradham, Rahul. Adaptive Multimedia Content Delivery for Scalable Web Servers. May 2001.*

(Continued)

*Primary Examiner* — Bryan Lee
(74) *Attorney, Agent, or Firm* — Yee & Associates, P.C.; Lisa Ulrich

(57) ABSTRACT

A method and system for dynamically altering the delivery of web content to end users based on server load. Responsive to receiving a client request for web content, utilization metrics are collected from a plurality of devices that deliver the web content to the end users. Individual load levels for the devices are determined respectively, based on the utilization metrics of the devices, a combined load level is determined for two or more of the devices having the same device type based on the individual-load levels, and a service level to provide to the client is determined based on the combined load level. The request header is modified to specify a rate to deliver the web content to the client based on the service level. The request is sent with the modified header to one of the devices to serve a variant of the web content to the client at the specified rate.

15 Claims, 6 Drawing Sheets

(56) References Cited

U.S. PATENT DOCUMENTS

| | | | | |
|---|---|---|---|---|
| 2008/0270610 | A1* | 10/2008 | John et al. | 709/226 |
| 2009/0164646 | A1 | 6/2009 | Christian et al. | |
| 2009/0327827 | A1* | 12/2009 | L'Heureux et al. | 714/748 |
| 2010/0125656 | A1* | 5/2010 | Karasaridis et al. | 709/224 |
| 2012/0176998 | A1* | 7/2012 | Muellner et al. | 370/329 |

OTHER PUBLICATIONS

Ma et al. A framework for adaptive content delivery in heterogeneous network environments. HP. 2000.*

Seshan et al. Benefits of Transparent C Ontent Negotiation in HTTP. 1998.*

Stemm et al. A Network Measurement Architecture for Adaptive Applications. 2000.*

Ding et al. A Framework of HTML Content Selection and Adaptive Delivery. 2005.*

Abdelzaher et al. Web content adaptation to improve server overload behavior. 1999.*

Abdelzaher et al. Web Server Qos Management by Adaptive Content Delivery. 1999.*

Jan et al. An Optimication model for Web Content adaptation. 2005.*

Choi et al., "Dynamic Resource Management for Longevity in Web Server Systems", 2009 11th IEEE International Conference on High Performance Computing and Communications, pp. 636-641.

Liu et al., "Real-time Application MonitoNing and Diagnosis for Service Hosting Platforms of Black Boxes", 2007 IEEE International Symposium on Integrated network Management , pp. 216-226.

Holtman et al., "Transparent Content Negotiation in HTTP", RFC2295, Mar. 1998, pp. 1-55 http://www.ietf.org/rfc/rfc2295.txt.

"Apache HTTP Server Version 2.0 Content Negotiation", pp. 1-6, The Apache Software Foundation 2009.

IBM, "System and Method of Client Based Load Migration among Mirror Sites", Feb. 28, 2008, IPCOM000168014Dpp. 1-2.

* cited by examiner

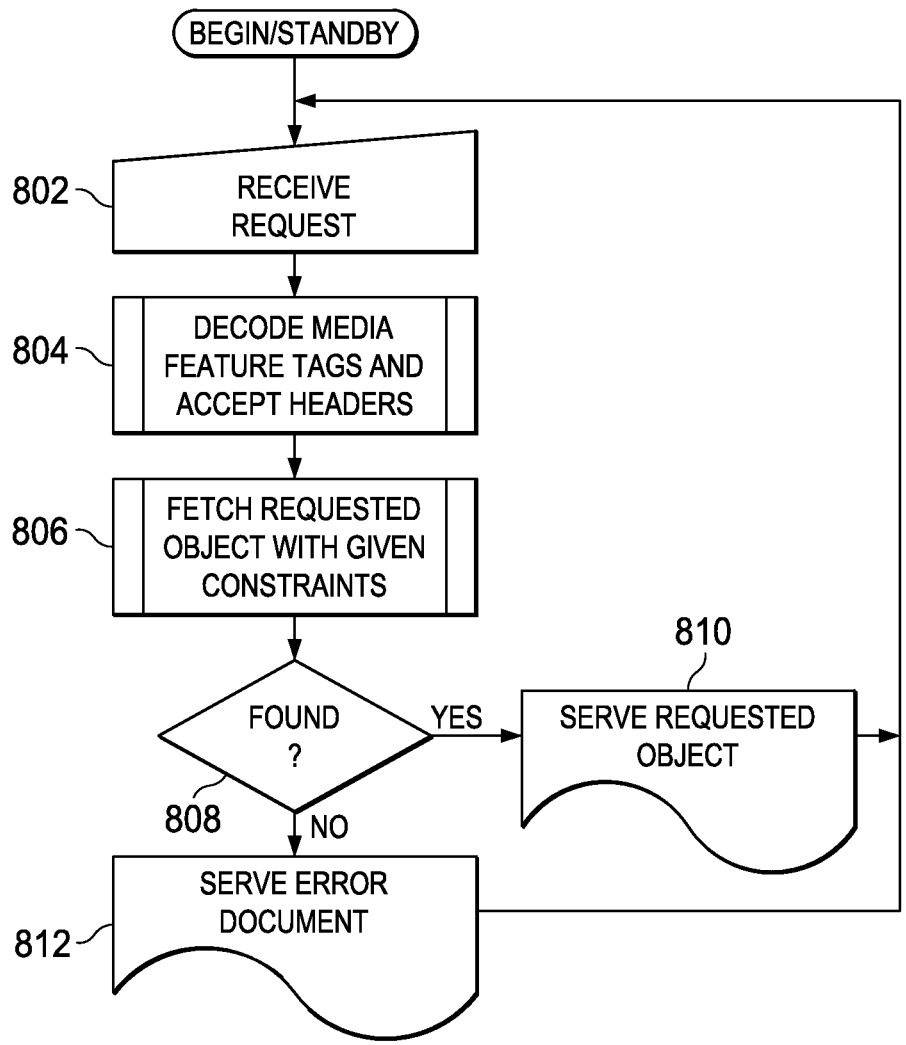

TRANSPARENT HEADER MODIFICATION FOR REDUCING SERVING LOAD BASED ON CURRENT AND PROJECTED USAGE

BACKGROUND

1. Field

The disclosure relates generally to an improved data processing system, and more specifically to a computer implemented method, apparatus, and computer program product for dynamically altering the delivery of web content to end users based on current and projected server load.

2. Description of the Related Art

From its very beginnings as a collection of hyperlinked text documents, the World Wide Web (WWW) has grown increasingly complex as it evolves to bring end users increasingly rich web experiences. Such experiences now include embedded programs and large binary objects as well. This evolution has mostly occurred with backwards compatibility, such that new features are added without removing support for the old features. Therefore, while the modern methods of delivering a web experience are computationally more expensive, the older methods are still valid and may be leveraged to fulfill the core mission of a web application. By creating several variants of the web content with increasing degrees of richness, an appropriate level of web experience may be delivered to an end user. Providing such richness content variants is similar to methods in which multilingual versions of content are developed and used.

Content negotiation is a mechanism defined in the HyperText Transfer Protocol (HTTP) specification that enables a web server to serve different versions of a document (or more generally, a resource) under the same Uniform Resource Indicator (URI), so that a client agent can specify which version best fits the client's capabilities. Each of these different content versions is called a 'variant'. Content negotiation helps determine what form content should take, given the characteristics and preferences set on both the server and client side. Thus, the same source data may be rendered in various ways, based on different access scenarios and available equipment. One of the most classic uses of the content negotiation mechanism is serving an image in multiple image formats, such as GIF or PNG format. If a user's browser does not understand one format (e.g., PNG), the browser can still display the other (e.g., GIF) version. Additionally, a document or resource may be available in several different representations. For example, the resource might be available in different languages or different media types, or a combination of the two. One way of selecting the most appropriate content to serve the user is to provide the user with an index page and allow the user to manually select the particular content variant to be delivered. However, it is often possible for the server to automatically choose the web content variant to be delivered. Automatic content variant selection by the server can be implemented because browsers can send, as part of each content request, information about the variants they prefer. For example, a browser may indicate that it would like to see information in French, if possible, otherwise English is acceptable. Browsers may indicate their variant preferences in headers in the request, as detailed in RFC 2295—Transparent Content Negotiation. Transparent content negotiation is an extensible negotiation mechanism, layered on top of HTTP, for automatically and efficiently retrieving the best variant of content when a GET or HEAD request is made (i.e., when the URL is accessed). Transparent content negotiation is called 'transparent' because it makes all variants which exist inside the source server visible to outside parties. Extensions to the transparent content negotiation are detailed in RFC 2506—Media Feature Tag Registration Procedure. Content negotiation, being a dialogue to produce an agreement on a course of action, requires participation from all parties. While transparent content negotiation may be used by browsers to specify the type of web experience to provide their end users, browsers are only aware of their individual capabilities and know nothing about the overall web content usage patterns or adoption levels. Browsers therefore are not in an advantageous position to furnish any actionable information to the content servers, and therefore are not in a position to participate in this type of content negotiation.

The flash crowd phenomenon where real-life crowds gather suddenly, spontaneously, and unpredictably is a well understood phenomenon that has also been observed on the World Wide Web, where the effect is the inability of a web site to serve resources to users at the desired level, and sometimes even crashing. This flash crowd effect often occurs when a relatively unpopular web site catches the attention of a large number of people and receives an unexpected surge in traffic. Typically less robust websites cannot cope with the instant surge in traffic and quickly become unavailable. However, there are relatively large websites that must contend with flash crowds on a regular basis, and at times lack capacity and suffer the same inability to serve resources at the desired level. These may be sites that by their nature provide ephemeral or event-driven content, and often include vendor, sports, news, and weather sites.

People familiar with the art of delivering web content will find it evident that it is more computationally expensive to deliver a complex, dynamic, and feature-rich web experience than simpler ones based on mostly static or solely on text elements. To maintain a consistent web experience for end users that request a website, organizations that expect flash crowds on their websites usually design their infrastructure to the expected peak. This is an expensive proposition that leads to under-utilized resources when the interest is low. In addition, web content delivery failure may occur if the assessment of expected peak is too low. Some organizations choose to lessen the impact of fluctuating interest by varying the amount of computational resources that are available as the interest ebbs and flows by reducing resources available to workloads that are considered to be less critical. However, if the computational requirements of delivering the web content can be dynamically altered to match the amount of interest a website is receiving at any given time, organizations would extract better value from their infrastructure investment. Additionally, organizations would benefit from the value created in their user base by the ability to maintain a satisfactory end user experience at all times for all workloads. Organizations do vary the computational requirement of delivering web content. Content shedding is the process of temporarily removing the more expensive or heavy content from the website, especially when heavy traffic results in the system being overloaded and immediate need is required to reduce hits on the site. However, this is a slow and manual process that is often done too late and becomes restorative in nature.

SUMMARY

According to one embodiment of the present invention, a computer implemented method, apparatus, and computer program product is provided for dynamically altering the delivery of web content to end users based on current and projected server load. Responsive to receiving a request from a client, the illustrative embodiments collect utilization metrics from each device in a plurality of devices involved in delivering web content to end users. A device load level is determined for each device based on the utilization metrics, and a system load level is determined for a subset of the plurality of devices having the same device type based on the device load level for each device in the subset of devices. A service level is determined to provide to the client based on the system load level for the subset of devices. The illustrative embodiments then modify the header in the request to specify the determined service level to provide to the client, wherein the determined service level indicates a variant of the web content to deliver to the client. The request is sent with the modified header to a selected device in the subset of devices, wherein the device serves the web content according to the determined service level to the client.

BRIEF DESCRIPTION OF THE SEVERAL VIEWS OF THE DRAWINGS

FIG. 8 is a flowchart of a process for handling, by a web server, a web content request comprising a modified header specifying a level of service in accordance with the illustrative embodiments.

DETAILED DESCRIPTION

Figure 1:
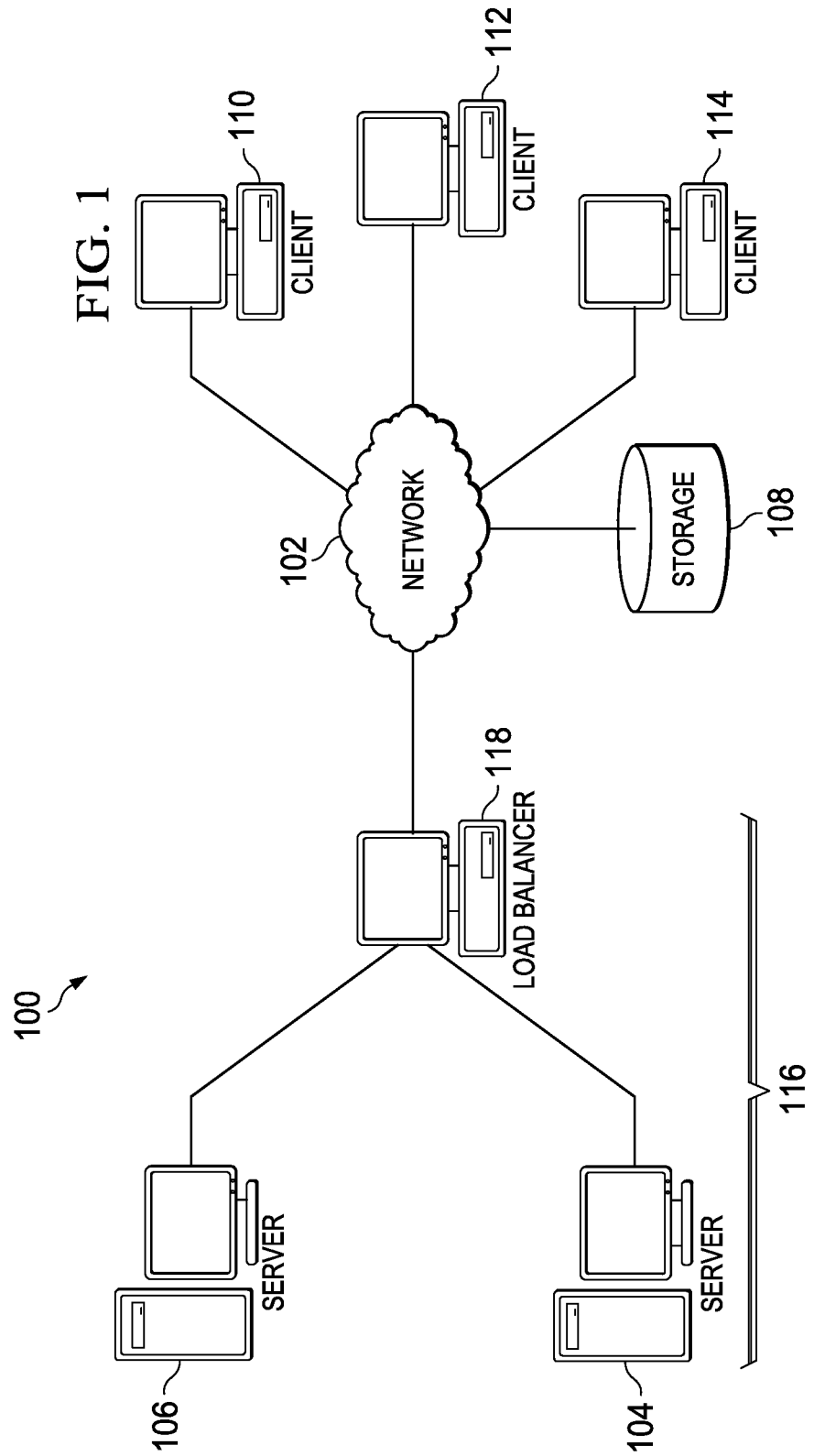
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can, store, or transport the program for use by or in connection with the instruction execution system, apparatus, or device but does not encompass a propagation media.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 are only provided as an illustration of one implementation and is not intended to imply any limitation with regard to the environments in which different embodiments may be implemented. Many modifications to the depicted environments may be made.

FIG. 1 depicts a pictorial representation of a distributed data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Network data processing system 100 includes data center 116 connected to network 102. Data center 116 may be a single physical building or multiple physical buildings designed to house two or more web servers. In other words, data center 116 is a location at which two or more web servers are loosely connected to provide web content services to users. In the depicted example, data center 116 includes server computer 104, server computer 106, and load balancer 118. Clients 110, 112, and 114 may send requests to access documents or resources to data center 116 through network 102. Load balancer 118 located at data center 116 may distribute workload evenly across two or more computers, network links, CPUs, hard drives, or other resources, in order to obtain optimal resource utilization, maximize throughput, minimize response time, and avoid overload. In this example, load balancer 118 routes each request from a client to access a selected web server in data center 116. For example, a request from client 110 received at data center 116 may be routed by load balancer 118 to web server 106. Web server 106 in response sends the requested web content back to requesting client 110 via network 102.

In this example, network data processing system 100 includes a single data center. However, network data processing system 100 may be connected to multiple data centers. Network data processing system 100 may also include additional web servers, clients, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
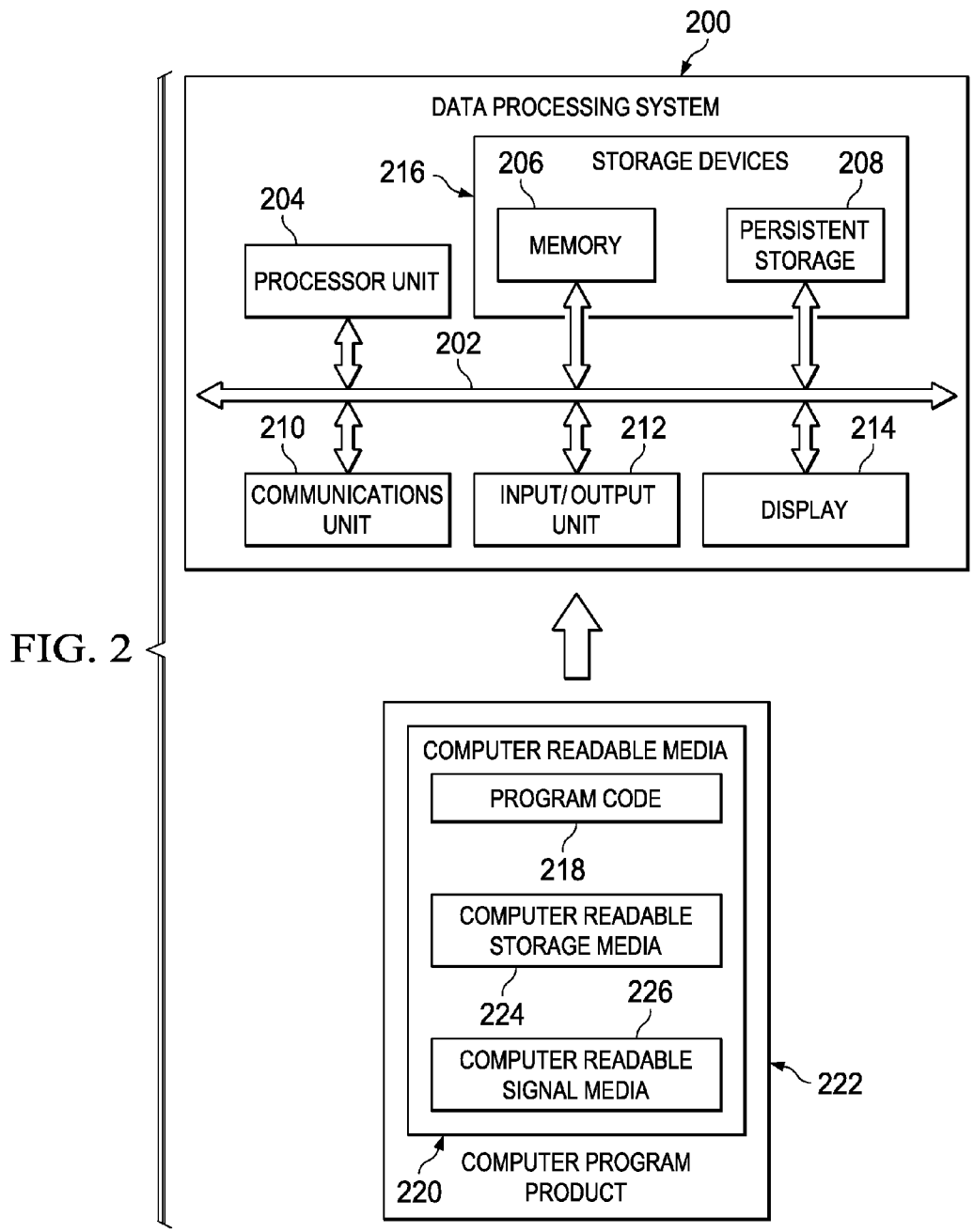
FIG. 2 is a block diagram of a data processing system in which the illustrative embodiments may be implemented.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information on either a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The illustrative embodiments provide a mechanism for varying the computational weight of web content programmatically to stay ahead of increasing demand and maintain a consistently satisfactory web experience for end users. While existing content shedding methods provide web content variants to end users based on the end user's browser capabilities, the illustrative embodiments allow for dynamically modifying website quality or richness based on the current and projected load on the web content servers. With the illustrative embodiments, current resource utilization information from all of the web servers in a data center involved in the delivery of the web experience is periodically collected and stored in a centralized location, such as a management console. From this collected information, a policy engine connected to the management console and positioned upstream from the web servers uses the collected resource utilization information to calculate the overall utilization levels or loads for each individual web server due to current demand level on each device (device loads). From the individual device loads, the policy engine may calculate an overall utilization level or load on the system due to the current demand level on plurality of the web servers (system load). The utilization levels can be discrete (low, medium, high) or continuous (a number quantity). The policy engine may then determine the level of service (i.e., the particular content variant) that a web server should provide to a client that requests content from the web server based on the determined system load.

A load balancer, acting as the client browser, may then use the transparent content negotiation protocol to modify the header of the client request and indicate the content variant that should be served to the end users as determined by the policy engine. A load balancer is a device in a network that is located between a client requesting a resource and the web servers that may provide the resource to the client and distributes the load across the web servers by routing client requests to selected web servers. Whereas web servers, application servers, and other types of servers may know the amount of resources that each server is using individually, load balancers know the aggregate amount of traffic they are managing for each of these servers that are downstream. In one embodiment, the load balancer may modify the client request by injecting media feature tags in the header of the request for the established service level, and route the modified request to a selected downstream web server. When the downstream web server receives the modified client request, the web server may fulfill the request and deliver a variant of the requested content in a manner that is appropriate for the current level of utilization of the service in the system.

The illustrative embodiments provide several advantages to traditional approaches of adding computational resources on demand for delivering web content. For instance, the illustrative embodiments match the supply of computing resources to demand for computing resources, which lessens the demand while keeping the supply constant and ensuring a satisfying web experience for end users. Since providing computing resources is an expensive proposition, the illustrative embodiments intrinsically achieve satisfactory web experiences in a more cost-effective manner, as compared to traditional approaches of adding computational resources on demand. In addition, the illustrative embodiments allow for making adjustment decisions rapidly, that a human could not make, which leads to timely application of corrective actions, and which in turn yield shorter-lived exception situations. All else being equal, content providers want to provide the richest most satisfying experience to their end users, while not spending money in creating content to support complex and rich experiences if such experiences are not to be provided to the user. Therefore, content shedding is an exception condition that is entered into reactively as a response to an alarm of dwindling system resources and should last for only brief periods. Content shedding, like all corrective actions, has the most impact the earlier an exception condition is identified. Furthermore, faster application of corrective actions leads to reduced cost. A system that is able to react quickly to changing conditions is one that may be made to run more efficiently due to the confidence that spare reserve capacity can be reduced. This reduction in reserve capacity leads to lower deployed capacity, which costs less to procure and maintain. Moreover, the illustrative embodiments achieve protection of brand image with the graceful failure of the system. A system that fails gracefully will mask its failure from its users and continue to provide service, even if in a degraded manner.

Figure 3:
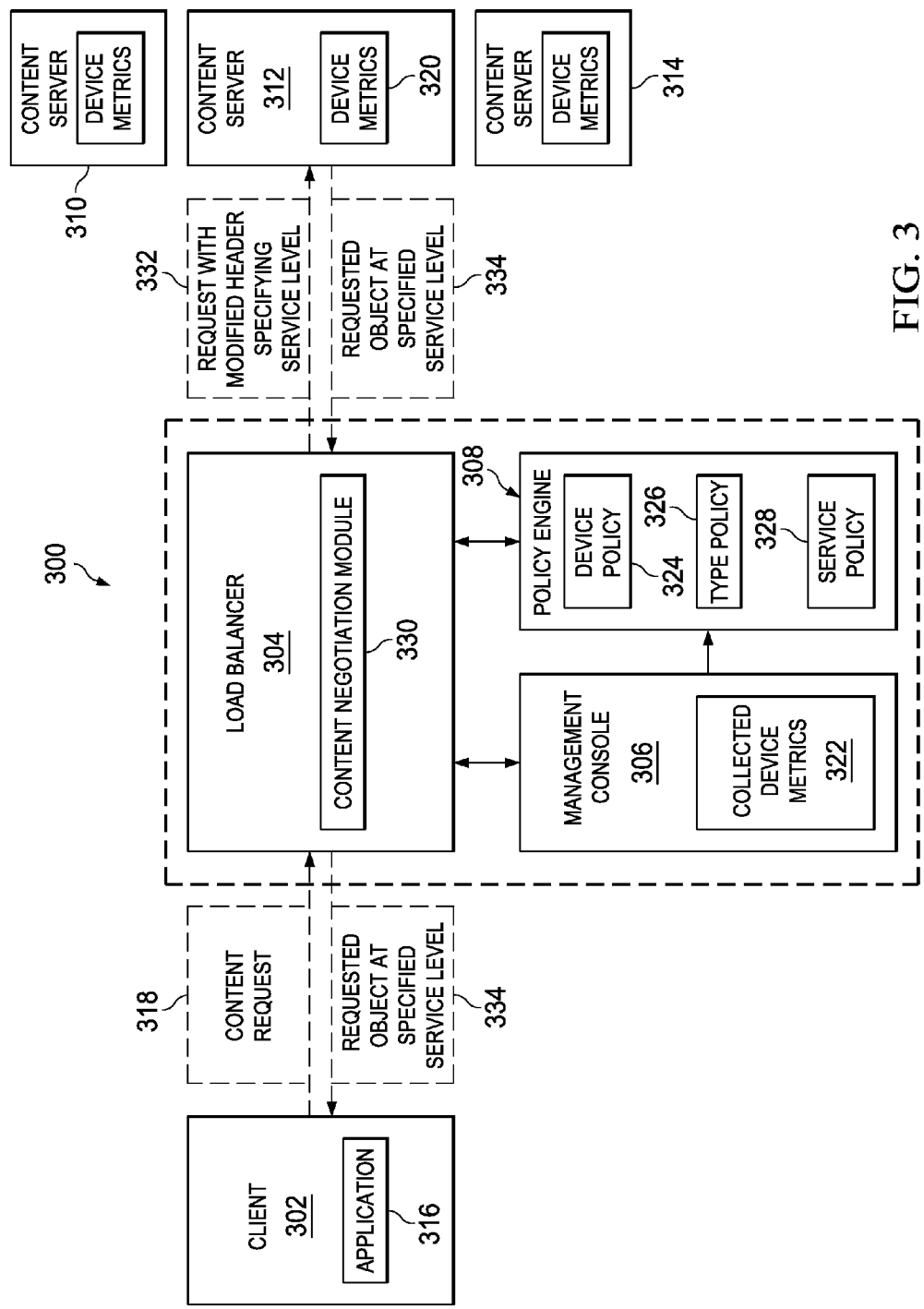
FIG. 3 is a block diagram of an exemplary dynamic web content delivery system in which the illustrative embodiments may be implemented.

With reference now to FIG. 3, a block diagram of an exemplary dynamic web content delivery system in which the illustrative embodiments may be implemented is shown. Web content delivery system 300 may be implemented in a network of data processing systems, such as network data processing system 100 in FIG. 1. Web content delivery system 300 is a data processing system that includes a plurality of hardware and software components or modules that web content delivery system 300 uses to dynamically alter the delivery of web content to end users based on the current and projected load on the web servers. Web content delivery system 300 is shown to include client 302, load balancer 304, management console 306, policy engine 308, and content servers 310-314. However, it should be noted that web content delivery system 300 is only meant as an example and not intended as a limitation on different illustrative embodiments. In other words, web content delivery system 300 may include more or fewer components as necessary to accomplish processes of the different illustrative embodiments.

Client 302 is an example of client 110, 112, or 114 in FIG. 1. Client 302 may include client application 316, which may comprise a web browser through which one or more resources may be requested from content servers 310-314. A browser is a program capable of submitting a request for information 318 identified by a URL at the client machine. Retrieval of information on the web is generally accomplished with an HTML-compatible browser, such as, for example, Internet Explorer®, which is available from Microsoft Corporation. In one embodiment, client 302 may request and receive access to a particular web resource using a standard communication protocol, such as Hypertext Transfer Protocol (HTTP).

Content servers 310-314 are examples of servers 104 or 106 in FIG. 1. Content servers 310-314 are devices that provide information technology content to requesting clients over a network, such as network 102 in FIG. 1. In one embodiment, content servers 310-314 comprise a cluster of web servers that delivers (serves) a requested object, such as a web page, using HTTP over the Internet. These web servers may deliver HTML documents and any additional content that may be included by a document, such as images, style sheets and JavaScripts. Application 316 in client 302 may initiate communication by making a request for a specific resource using HTTP and at least one of content servers 310-314 may deliver the resource or an error message if unable to provide the resource. Each web server in the cluster may deploy several applications providing one or more different services to users. An application providing a given service may be replicated on multiple web servers in the cluster. The replication of the application allows multiple requests to access given content to be handled concurrently by two or more servers. In addition, replication of the application on multiple web servers also allows the content to remain available even if one server providing the content is down or unavailable. Each content server also periodically measures and collects system metrics about the content server, such as the set of device metrics 320 collected by content server 312. The frequency at which device metrics are collected by a content server may be configured by a system administrator. Device metrics are device measurements of the web server's current resource usage. Examples of device metrics may include, but are not limited to, available RAM, available storage, available CPU, available network bandwidth, number of page faults per second, or number of process threads, among others.

Management console 306 is coupled to load balancer 304 and policy engine 308. Management console 306 is a centralized component from which a system administrator may configure and monitor components in the system via a flexible interface. In one embodiment, management console is software program residing in a data processing apparatus, such as data processing system 200 in FIG. 2. Management console 306 may reside in a separate data processing apparatus from load balancer 304 and policy engine 308, or alternatively, load balancer 304, management console 306, and policy engine 308 may be located within the same apparatus. Management console 306 receives metrics reported from each content server 310-314 and stores these collected device metrics 322 in memory. Management console 306 provides these collected device metrics 322 to policy engine 308 to be used in determining the level of service (i.e., the particular content variant) to provide to a client based on the system load in response to receiving a request for web content from the client. Management console 306 also provides an interface to enable a system administrator to input the policies that are used in the content variant determination.

Policy engine 308 is coupled to load balancer 304 and management console 306. Policy engine 308 comprises a component that uses the input provided by a system administrator that defines policies to be applied to collected device metrics 322. In this example, these policies include a device policy 324, type policy 326, and service policy 328. These administrator-specified policies are applied against collected device metrics 322 to determine the level of service to provide to a requesting client based on the current load on the web server system.

Device policy 324 is a policy that is applied to the device metrics collected from a content server to calculate the load level on that individual content server. The device load level is a label that is used to describe the overall utilization or load on a device based on the current demand as reflected in the collected device metrics. In one embodiment, the device load level may comprise a weight value of low, normal, or high, or the load level may comprise a number quantity. To determine the device load level for a content server, device policy 324 first assigns weight values to the metrics reported by and collected from a content server, and these values reflect the relative weight or importance of one metric against another from the same content server. An n-tuple, which is a fixed size collection of elements, may be used in device policy 324 to describe the device metrics measured for each device and the weight assigned to each metric. For example, metric values collected for the central processing unit (CPU) or memory of a content server may take the form of a percentage of CPU or memory usage. In this scenario, n-tuples for the device policy for such usages may be as follows: <=10% usage is 'low', <=50% usage is 'normal', <=80% usage is 'high'. In another example, for metric values collected for the network and disk usage of a content server, the n-tuples for such usages may be as follows: <=100 units usage is 'low', <=500 units usage is 'normal', <=1000 units usage is 'high'.

Once weight values (e.g., low, normal, high, or numerical values) are assigned to each metric collected from the content server, a threshold level also specified in device policy 324 is used to determine the overall device load level on the content server. The threshold level is a singleton value that is used by policy engine 308 to determine which metrics collected from the content server should reflect the overall device load level on the content server. Examples of the threshold level in the device policy may include 'highest', 'average', 'all', and 'lowest'. Thus, when policy engine 308 applies device policy 324 to a set of device metrics 320 collected for content server 312, if the threshold level specified in device policy 324 is 'highest', policy engine 308 may determine that the metric in the set of metrics collected for the content server that has the highest assigned weight value will be representative of the content server's overall load level. In a similar manner, a threshold of 'lowest' would cause policy engine 308 to determine that the metric that has the lowest assigned weight value for the content server is representative of the content server's load level. A threshold of 'average' causes policy engine 308 to coalesce the n-tuples for the metrics of the content server into a single device load level value, wherein the determined device load level is an average of all of the assigned weight values for that content server. Like the 'average' threshold level, a threshold of 'all' causes policy engine 308 to coalesce the n-tuples for the metrics of the content server into a single device load level value. However, the 'all' threshold level requires that all weight values of the content server be at a maximum load level (e.g., 'high') before policy engine 308 may determine that the content server is operating at an overloaded device load level, and thus a content variant that provides a less rich web experience and is less computationally expensive may be delivered to the requesting client.

Type policy 326 is a policy that is applied to individual device load levels or to a group or subset of content servers having the same device type to weight the device metrics according to the type of device. In other words, when calculating device load, the type of device may factor into the determination of whether the device load is low, normal, or high. A server is a same device type as another server if its physical and logical attributes match those specified in the device type attributes specified by an administrator. Examples of physical attributes include the hardware class, such as mainframe, enterprise server, or department server, and typically subsets of hardware class including the CPU architecture or as granular as the manufacturer, hardware type, and hardware model. Examples of logical attributes include the operating system, such as IBM® AIX® or Linux®, operating system version and patch level, and type of application infrastructure, such as for example, IBM HTTP or Apache® HTTP web servers, IBM WebSphere® or Apache Tomcat® web application servers, IBM DB2®, or MySQL® database, etc. IBM, AIX, WebSphere, and DB2 are trademarks of International Business Machines Corporation, registered in United States, other countries, or both. Linux is a registered trademark of Linus Torvalds in the United States, other countries, or both. Therefore, a type policy may weight device load levels according to relative importance of each metric according to the device type. For example, a device type known to aggressively make use of any available RAM may have available RAM weighted less than on other device types. The system administrator may chose to further define additional device types via management console 306. These additional device types may include any combination of the physical and logical attributes that may be discovered to influence the weight of metrics.

The system load level is a label that is used to describe the overall utilization or load on the system (i.e., the subset of same-device type content servers) due to current or projected demand as reflected in the device metrics collected for the subset of content servers. The system administrator may define in the type policy whether the system load level is based on the current load of the system (current server utilization), the projected load of the system (anticipated server utilization), or both. The current load on the system is the load measured on the system at the current point in time, while the projected load is an estimate of where the system load will be N time from now based on an algorithm the administrator specifies, or an algorithm that is calculated based on analyzing past system load level results. One example where projected load may be utilized is in serving large files, such as media streaming. When determining which bit rate of media to serve to an end user, a projection of system load from now until N time from now may be useful, where N is the duration or expected duration (given many users close a stream before it ends) of the media. Thus if a two hour media is requested, the content server may serve a reduced bit rate stream if the projected load within the next two hours suggests higher bit rates streams will fail. In addition, if past system load level results show the content servers have a high percentage of failure once the CPU utilization of the content servers exceeds 75% for 2 minutes, then the content server may serve less intensive resources to the requesting end users once this utilization event occurs, even if the 75% measurement is not in and of itself a current load problem.

N-tuples may also be used in type policy 326 to describe the system load level. For example, the system load level may comprise a weight value of low, normal, or high, or the load level may comprise a number quantity. To determine the system load level for a subset of content servers of the same device type, policy engine 308 first reads both the type policy 326 and the device load levels calculated from applying the device policy 324 to each content server in the subset from memory. A threshold level also specified in type policy 326 is then used to determine the overall system load level on the subset of content servers. Examples of the threshold level in type policy 326 may include 'highest', 'average', 'all', and 'lowest'. Thus, when policy engine 308 applies type policy 326 to the device load levels for a plurality of content servers of the same type (e.g., content servers 310, 312, 314), if the threshold specified in device policy is 'highest', policy engine 308 may determine that the device load level that has the highest assigned weight value for the subset of content servers of the same type is representative of the current load level on the system. In a similar manner, a threshold of 'lowest' would cause policy engine 308 to determine that the device load level that has the lowest weight value for the subset of content servers of the same type is representative of the current load level on the system. A threshold of 'average' causes policy engine 308 to determine that the current load level on the system is an average of the weights of all of the device load levels for those content servers. Like the 'average' threshold level, a threshold of 'all' causes policy engine 308 to coalesce the n-tuples for the device load levels into a single system load level value. However, the 'all' threshold level requires that all device load levels of all of the content servers in the subset be at a maximum load level (e.g., 'high') before policy engine 308 may determine that the content servers are operating at an overloaded system load level, and thus a content variant that provides a less rich web experience and is less computationally expensive may be delivered to the requesting client.

Service policy 328 is a policy that is applied to the system load level calculated from the subset of content servers of the same type. Service policy 328 is used to determine the level of service to provide to requesting client 302 based on the current load on the system. A service level is a label that describes the level of end user experience that the service is providing at any given time, wherein each level of service may provide more or less web content and features to the end user than another level of service. Service levels providing reduced content and features may remove the more expensive or heavy content from the website. Examples of service levels may include normal service, static-only service, mobile-only service, dynamic service, etc., as may be defined locally by each installation. A normal level may describe the default experience level, static-only may describe an experience level provided through easily-cached static objects only, mobile-only may describe an experience level that is being provided for light-weight mobile clients, and dynamic may describe an experience level in which all content and features are provided to the client. Service policy 328 includes a table that may be referenced by policy engine 308 to map the availability of a particular content service level to a given system load level. In other words, based on the system load level that is determined from applying type policy 326 to the aggregated device metrics for a subset of content servers of the same type, service policy 328 specifies which service level (i.e., variant of the web content) should be requested from one of the content servers that provides the web content. For example, service policy 328 may specify that if the system load level is determined to be low or normal, the service level at which the content server that provides the web content to the requesting client may operate at the dynamic service level, thereby providing full web content and features to the end user. In contrast, service policy 328 may also specify that if the system load level is determined to be high, the service level at which the content server that provides the web content to the requesting client may operate at the static service level, thereby serving low bit rate media streams and reducing number of graphics provided to the end user.

Load balancer 304 is an example of load balancer 118 in FIG. 1. Load balancer 304 comprises a software program running on a data processing apparatus that is used to distribute workload evenly across the content servers in order to achieve optimal resource utilization and maximize throughput, while minimizing response time and avoiding overload. Load balancer 304 manages the various requests to access web content on the data cluster to enable optimal performance of the applications on the cluster. Load balancer 304 is a front-end component for controlling and managing the loads on two or more servers. Load balancer 304 performs load balancing based on device metrics collected for the two or more content servers connected to load balancer 500. Load balancer 304 may be a software component, a hardware component, or a combination of hardware and software. Typically, all requests to access content on a data cluster are routed by load balancer 304 to a backend server such as content servers 310, 312, or 314, depending upon the load on each server. The load refers to the amount of work currently being performed by the server. Load balancer 304 receives a request from client 302 for an application, selects a given content server to run the application, and distributes the request to the selected backend content server. Load balancer 304 listens on the port where external client 302 connects to access web services. Load balancer 304 forwards requests to one of the backend content servers, which usually replies to the load balancer, thereby allowing load balancer 304 to reply to client 302 without the client ever knowing about the internal separation of functions. Load balancer 304 also prevents clients from contacting backend content servers directly, which may have security benefits by hiding the structure of the internal network and preventing attacks on the kernel's network stack or unrelated services running on other ports.

Load balancer 304 is a specific type of load balancer that uses information available in the application layer of the OSI (Open Systems Interconnection) Reference Model to make load balancing decisions. The OSI Reference Model comprises a set of seven layers (application, presentation, session, transport, network, data, and physical) that define the different stages that data must go through to travel from one device to another over a network. Each layer adds its own set of special, related functions that prepare the data for the next layer. The application layer, or layer 7, is the layer that interacts with the operating system or application whenever the user chooses to transfer files, read messages or perform other network-related activities. HyperText Transfer Protocol (HTTP) is an example of an application layer protocol.

Like a typical load balancer, load balancer 304 comprises the ability to read and understand the HTTP protocol to make load balancing decisions, such as those required for cookie-based affinity. Cookie-based affinity is where the load balancer checks the existence of a cookie (having been set on a prior visit to the web site), and so the previous network check to determine which server will give the user fastest service (usually due to being physically closer to the user) does not need to be made, and so the load balancer can save time by automatically routing the user to the previous server they were on. However, load balancer 304 in the illustrative embodiments is enhanced to allow for modifying HTTP headers in a client request. Once the policy engine determines the level of service (i.e., the particular content variant) that a content server should provide to a client that requests content from the content server based on the determined system load, load balancer 304, acting as the client browser, uses the transparent content negotiation protocol as defined in RFC 2295 to specify the content variant that should be delivered to the end users by modifying the header of the client request. Information in the request headers informs the receiving content server how to handle the request. For example, as load balancer 304 may modify or add to the current HTTP headers in the request, the headers in the request may instruct the content servers to serve low bit rate media to the requesting end user. In one embodiment, load balancer 304 may modify the client request by injecting media feature tags in the HTTP header of the request for the service level determined by policy engine 308. A media feature tag is a standard description and negotiation mechanism in order to identify and reconcile the form of information to the capabilities and preferences of the parties involved as defined in RFC 2506—Media Feature Tag Registration Procedure. A media feature tag may comprise a string consisting of one or more of the following US-ASCII characters: uppercase letters, lowercase letters, digits, colon (":"), slash ("/"), dot (".") percent ("%"), and dash ("-"). Thus, media feature tags injected within a request header inform the receiving content server what media the requesting client browser supports, and the headers in the request inform the receiving content server how to handle the request. Taking language as an example, media feature tags may specify the browser prefers English (en), but is also capable of Spanish (es). However, the headers may request a language of Spanish, such that if the requested page is available in Spanish, the content server will serve the Spanish version to the end user.

Load balancer 304 conserves computational resources by using content negotiation module 330 to transparently modify the headers of the content requests to reduce computational load on the servers, while still enabling the servers to provide an error-free web experience for end users even under load conditions. HTTP headers in the client request may include multiple dimensions, such as media type, language, encoding, and character-set, as specified in the Accept, Accept-Language, Accept-Encoding, and Accept-Charset headers, respectively, as defined in RFC 2616, section 14—Header Field Definitions. Load balancer 304 may perform header modification in one of two ways. The first method of header modification comprises language replacement. For instance, language replacement comprises a method in which the Accept-Language header in the content request 318 is modified to a predetermined "language" supported by the content server that requires less computational resources to deliver. For example, if a page is available in English, the web content creators may create two pages, a standard page and a lightweight or "content shedded" page. On the content server, these pages may be stored in distinct directories. If a determination is made that the system load level is such that computational resources need to be conserved, load balancer 304 may modify the Accept-Language header of content request 318 before sending the request with the modified header 332 to a selected content server. For example, if the client sends a request with an Accept-Language header of "en", load balancer 304 may modify the header to request a content-shedded variant, such as "enshed". When the selected content server receives the modified request, a configuration directive on the content server may direct the content server to retrieve content for the request from the "content shedded" directory, and serve the content at the service level specified in the request 334 to the client end user. Thus, the content server is now able to intelligently fulfill requests for web content and deliver a variant of the requested content in a manner that is appropriate for the current level of utilization of the service in the system.

The second method of header modification comprises header replacement. Header replacement comprises a method for modifying any header delivered with a content request if that modification results in reduced computational load on the system as needed. For example, to reduce load, load balancer 304 may remove a header from the content request that specifies the client can render Flash® content. Flash is a registered trademark of Adobe Systems Incorporated. Flash content may be particularly computationally intensive to serve, and therefore modifying the header to prevent the serving of such content will reduce computational server load. Load balancer 304 may prevent Flash content (or other content) from being served by removing an Accept header that specifies client compatibility with Flash. The content server is configured to provide other content in place of Flash content if that Accept header lacks a Flash designation, thus reducing computational load.

One implementation of the aspects of the illustrative embodiments may be as follows: a system administrator of a web service inputs into policy engine 308 the several policies that are to be used, such as the device policy 324, the type policy 326, and the service policy 328. The system administrator may provide this policy input via management console 306. Each device that participates in the delivery of the web content is enabled to periodically report a set of system metrics to a centralized location, such as management console 306. Management console 306 stores these reported metrics from all of the reporting devices as collected device metrics 322. The device metrics reported for each device may be dependent upon the type of the device. For instance, a database server may report a metric such as block I/O activity to management console 306, whereas a load balancer would not report such a metric. Periodically at configurable intervals, management console 306 activates policy engine 308 to apply the collected device metrics 322 against device policy 324 to determine a device load level for each content server. A device load level represents an overall current load level on that device. Once the policy engine 308 determines the device load level for each reporting content server, the policy engine 308 applies the type policy 326 to all content servers of the same device type to determine an overall system load level for the subset of content servers. Once the policy engine 308 determines the system load level for the subset of content servers, the policy engine applies the service policy 328 to the system load level to determine the level of service at which the content server should deliver the requested content to client 302. Policy engine 308 writes the determined device load levels, system load level, and service level to the management console 306. Load balancer 304 is used to distribute the end users' requests to one or more content servers. Load balancer 304 periodically polls or queries the management console 306 to obtain the current service level at which content should be delivered to a requesting client based on the current load level of the system. In one embodiment, load balancer 304 may insert a service level label directly into the layer 7 header as a defined media feature tag for transparent content negotiation and allow the content server to locate and serve the appropriate object variant. The content negotiation features in the HTTP protocol—transparent as in the case of transparent content negotiation or server-driven—allows load balancer 304 to negotiate the best-matching variant of content with respect to the overall system load and service level to be delivered to the requesting client.

Figure 4:
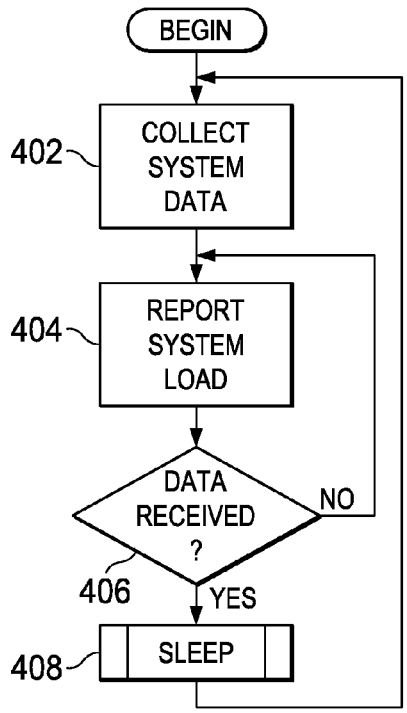
FIG. 4 is a flowchart of a process for reporting resource utilization to a management console in accordance with the illustrative embodiments.

FIG. 4 is a flowchart of a process for reporting resource utilization to a management console in accordance with the illustrative embodiments. The process described in FIG. 4 comprises a resource utilization collection process that may be implemented by each web content server (e.g., 310, 312, and 314) in web content delivery system 300 in FIG. 3. The resource utilization collection process enables the management console to obtain metrics comprising the load on each web content server in the system.

The process begins with a web server collecting data comprising resource utilization metrics that reflect the current load on the web content server (step 402). Once the metrics are collected, the web content server reports the metrics to a central location, such as management console 306 in FIG. 3 (step 404). The web server makes a determination whether the data has been received by the management console (step 406). If the management console has not received the data ('no' output of step 406), the process returns to step 404 to report the metrics to the management console. However, if the web content server determines that the management console has received the data ('yes' output of step 406), the data collection process sleeps until the next iteration of the data collection process is initiated (step 408). The data collection process may be initiated periodically by the web server at defined time intervals to ensure the management console is provided with updated utilization metrics.

Figure 5:
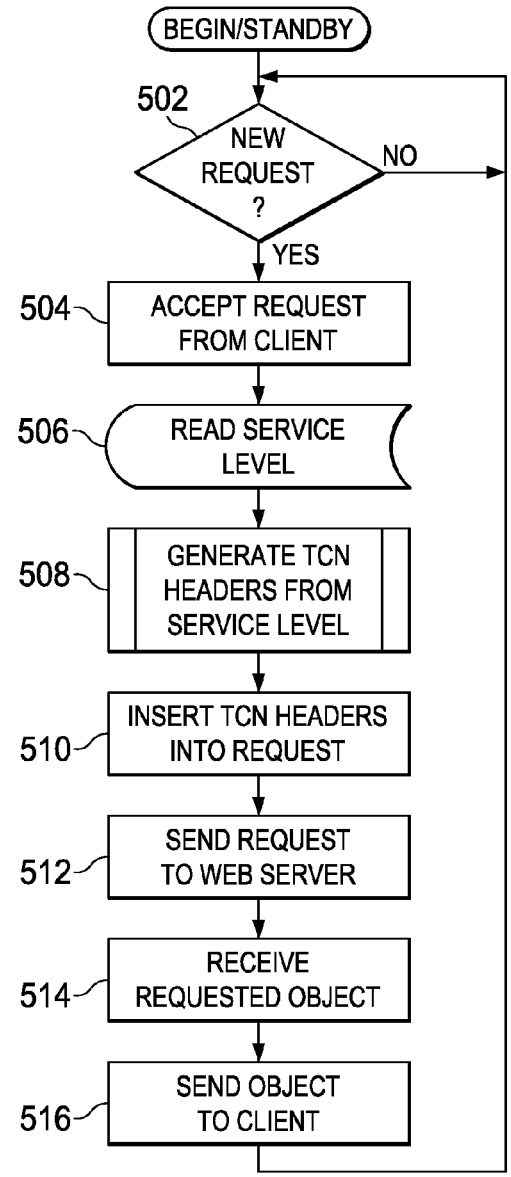
FIG. 5 is a flowchart of a process for dynamically adjusting web content provided to a requesting client based on current and projected server load in accordance with the illustrative embodiments.

FIG. 5 is a flowchart of a process for dynamically adjusting web content provided to a requesting client based on current and projected server loads in accordance with the illustrative embodiments. The process described in FIG. 5 comprises an overview of the web content negotiation process that may be implemented by load balancer 304 in web content delivery system 300 in FIG. 3 to service requests for web content. The web content negotiation process allows the load balancer to determine and specify the service level that a web server should provide to the client, while also reducing computational load on the servers and still enabling the servers to provide an error-free web experience for end users even under higher load conditions.

The process begins with the load balancer, responsive to receiving a client request for web content, making a determination as to whether the request is a new request (step 502). A request is not new if the request is a duplicate of the original request, such as when a browser repeatedly requests a page as it retries its request operation due to lack of timely response. In this case, there is no need for the load balancer to pass along the repeated requests if the original request is already being handled, and thus the request may be discarded. A request is also not new if the request is for a static resource that the load balancer has cached, in which case the load balancer can save web server resources by immediately returning the cached content. If the request from the client is not a new request ('no' output of step 502), the process returns to wait to receive another client request for processing.

However, if the request from the client is determined to be a new request ('yes' output of step 502), the load balancer accepts the request (step 504) and then reads the service level of the requested web content (step 506). The service level is determined by the policy engine by applying the service policy to the given system load level for the subset of servers involved in provided the web content and stored in memory, as described in the process of FIG. 7. The service level is the content variant that should be requested from a web server and provided to the requesting client. Once the load balancer reads the service level and thereby determines the content variant to be provided by a selected content server, the load balancer may use the transparent content negotiation protocol to specify the content variant that should be delivered to the client by modifying the header of the request based on the service level (step 508). The variant is one of a set of web content versions that is delivered to the requesting client based on the load on the web servers involved in providing the requested content.

The load balancer then inserts the transparent content negotiation header information into the client request to form a modified header (step 510). The load balancer acts as a web browser of the client and forwards the request comprising the modified header to a particular web server selected by the load balancer to service the request (step 512). When the load balancer receives the requested object delivered at the specified service level from the selected web server (step 514), the load balancer then forwards the object delivered at the specified service level to the requesting client (step 516).

Figure 6:
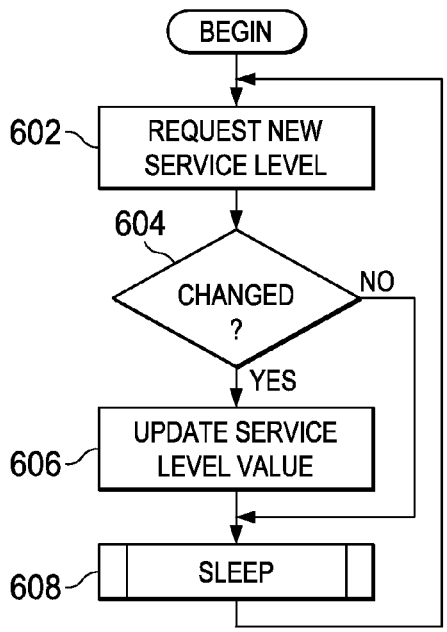
FIG. 6 is a flowchart of a process for obtaining an updated service level from the management console in accordance with the illustrative embodiments.

FIG. 6 is a flowchart of a process for obtaining an updated service level from the management console in accordance with the illustrative embodiments. The process described in FIG. 6 may be implemented by load balancer 304 in web content delivery system 300 in FIG. 3. The load balancer performs the process to obtain, from the management console, the current service level at which a selected web server should operate based on the current load level of the system. The load balancer may store the retrieved service level value in a cache memory of the load balancer for quick access.

The process begins with the load balancer requesting a service level from the management console (step 602). The load balancer may periodically poll the management console for the service level information at time intervals defined by a system administrator. The frequency of the time intervals may be based on the volatility of the web service and the capacity of the web servers. For instance, it the service volatility is high, the poll frequency would likely be higher than if the service volatility is low so that the system load can be averaged to avoid rash decisions. If service volatility is low, the poll frequency would likely be lower because a sudden plummet of system load is likely a meaningful event that requires service level reduction. In addition, a web server system with a large capacity does not need to be polled as often as one that is constantly overutilized. In one embodiment, the poll frequency may be performed every two to five minutes, in addition to sending a simple HTTP request every 30 seconds to all the web servers to ensure the servers are responding (the failure of a web server is evidence that the system load is high). If a server fails to report on time, an intermediate poll may be initiated to obtain updated service level information.

A determination is then made by the load balancer whether or not the service level for the service has changed since the last time the load balancer retrieved the service level (step 604). The service level may change due to variations in the workload amount of a web server, which changes the device and system load levels from which the policy engine calculates the service level. If the service level for a requested service has not changed ('no' output of step 604), the service update process is placed in a sleep state (step 608) until the process is initiated again by the policy engine (step 606). However, if the service level for a requested service has changed ('yes' output of step 604), the load balancer updates the service level value with the changed service level (step 606). The service update process may be initiated periodically by the load balancer at defined time intervals to ensure the load balancer is provided with the current service level value.

Figure 7:
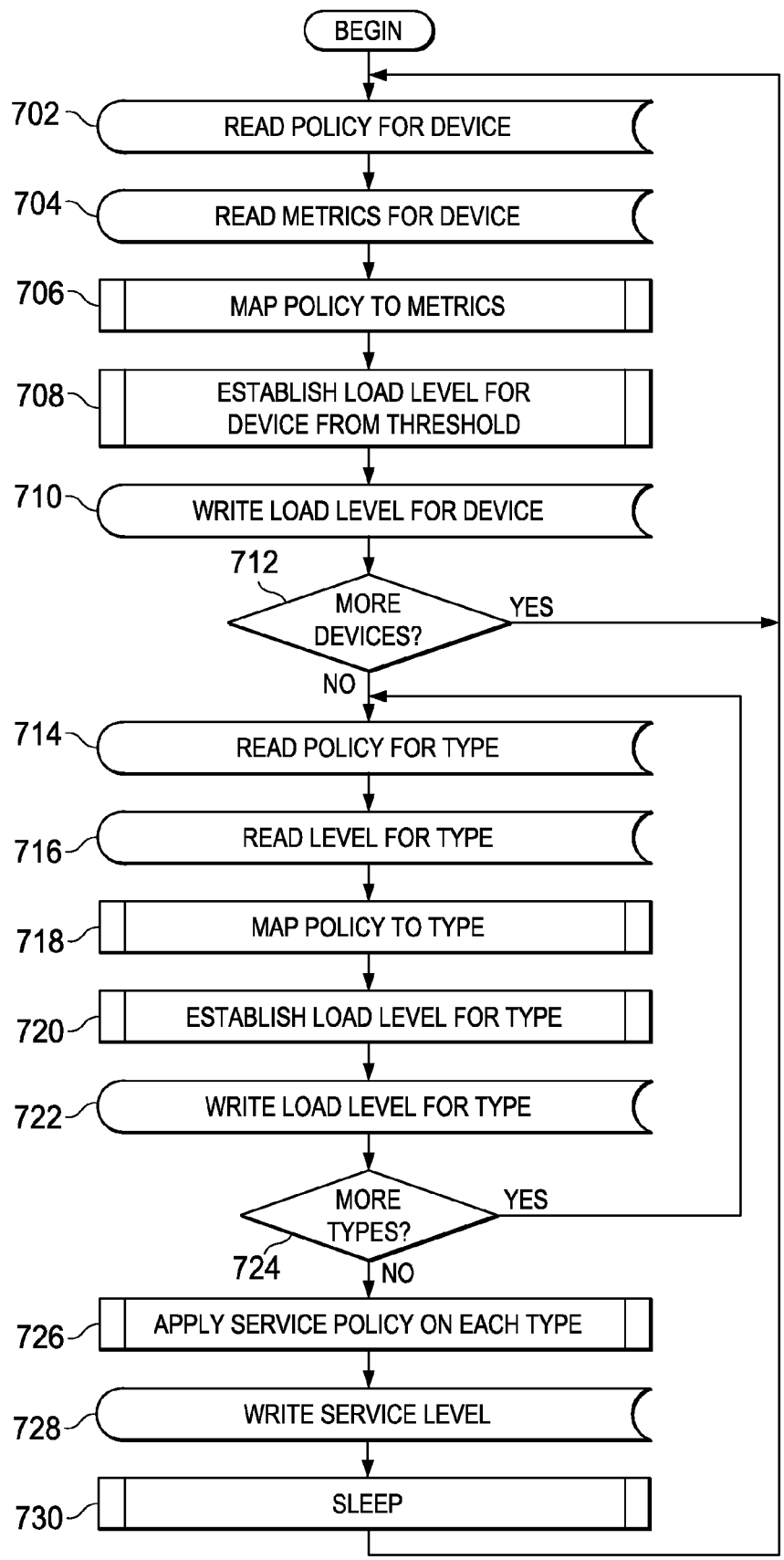
FIG. 7 is a flowchart of a process for generating a service level in accordance with the illustrative embodiments.

FIG. 7 is a flowchart of a process for generating a service level in accordance with the illustrative embodiments. The process described in FIG. 7 may be implemented by policy engine 306 in web content delivery system 300 in FIG. 3. This method is the main process undertaken by the policy engine to generate the appropriate service level to be provided to the layer 7 load balancer. The service level generation process may be initiated on a periodic basis by the policy engine at defined time intervals to ensure the load balancer is provided with the current service level at which a selected web server should operate and deliver content to the requesting client. Within the process, each device load level is aggregated by device type to establish a load level for a subset of web servers comprising the same device type, against which the type policy is applied to each device type subset to establish the overall service level for the system. The service level may then be inserted by the load balancer into the header of the client request.

The process begins with the policy engine reading the device policy (step 702) and reading the device metrics collected for a device (e.g., web server) from the management console (step 704). The policy engine then maps the device policy to the metrics for the device (step 706). This step comprises applying the device policy to the metrics for a device to assign an n-tuple value to each metric, such as low, medium, or high, based on the value of the metric. Once the individual metric n-tuple values are assigned, the policy engine establishes a device load level using a threshold defined in the device policy (step 708). Examples of the threshold load level in the device policy may include 'highest', 'average', 'all', and 'lowest'. The threshold load level specifies which of the metrics are to be used in establishing the overall load level for the device (e.g., only the metric with the highest load value (peak) since the last poll, only the metric with the lowest load value, the average of the metric load values, etc. The policy engine then writes the device load level to memory (step 710).

A determination is then made by the policy engine as to whether there are other individual devices to process (step 712). If there are additional individual devices to process ('yes' output of step 712), the process loops back to step 702. However, if there are no more individual devices to process ('no' output of step 712), the policy engine reads the type policy (step 714) and the load level calculated for each device of the same device type (step 716). The policy engine then maps the type policy to the device load levels for the devices of the same type (step 718). This step comprises applying the type policy to the individual device load levels to assign an n-tuple value to each device load level, such as low, medium, or high, based on the value of the load level. Once the individual device load level n-tuple values are assigned, the policy engine establishes a system load level using a threshold defined in the type policy (step 720). Examples of the threshold level in the type policy may include 'highest', 'average', 'all', and 'lowest'. The threshold level specifies which of the device load levels are to be used in establishing the overall load level for the system (e.g., only the device load level with the highest load value since the last poll, only the device load level with the lowest load value, the average of the device load level values, etc.). The policy engine then writes the system load level to memory (step 722).

A determination is then made by the policy engine as to whether there are other device type subsets to process (step 724). If there are additional device type subsets to process ('yes' output of step 724), the process loops back to step 714. However, if there are no more device type subsets to process ('no' output of step 724), the policy engine reads the service policy and applies the service policy to the calculated system load level to determine the level of service at which a selected web server should deliver the requested content to a client (step 726). Examples of service levels may include normal service, static-only service, mobile-only service, dynamic service, etc., as may be defined locally by each installation. The policy engine may apply the service policy to the calculated system load level by accessing a table that maps the availability of a service level (i.e., variant of the web content) to a given system load level. The policy engine then writes the service level to memory (step 728), wherein the service level may be accessed by the load balancer in the process described in FIG. 5. The service level generation process then sleeps until the next iteration of the service level generation process is initiated (step 730).

FIG. 8 is a flowchart of a process for handling a web content request comprising a modified header specifying a level of service in accordance with the illustrative embodiments. The process described in FIG. 8 may be implemented by web servers 310, 312, or 314 in web content delivery system 300 in FIG. 3 to service client requests for web content.

The process begins with the web server receiving a client request for web content (step 802). The client request comprises a header modified by the load balancer using transparent content negotiation to specify a service level in which the web server should provide the requested content. Upon receiving the request, the web server decodes the media feature tags in the request and headers in the request (step 804). The web server then fetches the requested object with the given service level constraints specified in the request (step 806). Thus, the web server selects the particular variant of the requested content that is appropriate for the service level specified in the request.

The web server then makes a determination as to whether a variant of the requested object that is appropriate for the service level constraint is found (step 808). If an appropriate variant is found ('yes' output of step 808), the web server serves the requested content to the client (step 810). However, if an appropriate variant is not found ('no' output of step 808), an error document is served to the client (step 812).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of delivering web content to a client, responsive to a request from the client, the method comprising:
    collecting utilization metrics from a plurality of devices that deliver web content to end users;
    determining, by one or more processors, individual load levels for each device in the plurality of devices, respectively, based on respective utilization metrics of the devices by: applying a device policy to the respective utilization metrics of each device in the plurality of devices by assigning, based on respective values of the respective utilization metrics, a weight value to each respective utilization metric;
    determining the individual load levels for each device in the plurality of devices based on weight values and a threshold level specified in the device policy, wherein the threshold level in the device policy specifies one of a highest assigned weight value, a lowest assigned weight value, or an average of assigned weight values of the respective utilization metrics; and
    writing the individual load levels to a memory;
    determining, by the one or more processors, a combined load level of two or more of the devices, in the plurality of devices, of a same device type based on the individual load levels for the two or more respective of the devices in a subset of devices in the plurality of devices;
    determining, by the one or more processors, a service level to provide to the client based on the combined load level;
    responsive to receiving the request from the client, modifying, by a layer 7 load balancer, a header in the request to specify a rate to deliver the web content to the client based on a determined service level, by:
    reading the determined service level from the memory;
    generating, using a transparent content negotiation protocol, a modified header based on the determined service level, wherein the modified header specifies a variant of the web content to deliver to the client; and
    inserting the modified header into the request; and
    sending the request with the modified header to one of the devices, wherein the one of the devices is directed to deliver the web content to the client at a specified rate.

2. The method of claim 1, wherein the steps of determining the individual load levels, determining the combined load level, and determining the service level are performed on a periodic basis at defined time intervals by a policy engine.

3. The method of claim 2, wherein determining the combined load level of the two or more of the devices of the same device type based on the individual load levels for the two or more respective of the devices further comprises:
    applying a type policy to the individual load levels determined for the two or more respective of the devices by assigning, based on a value of the individual load levels, a weight value to each individual load level;
    determining the combined load level for the two or more respective of the devices based on weight values of device load levels and the threshold level specified in the type policy, wherein the threshold level in the type policy specifies whether the combined load level is one of a highest assigned weight value, a lowest assigned weight value, or an average of assigned weight values of the individual load levels; and writing the combined load level to the memory.

4. The method of claim 3, wherein determining the service level to provide to the client based on the combined load level further comprises:
    applying a service policy to the combined load level determined for the two or more respective of the devices to specify, based on a value of the combined load level, the service level indicating a variant of the web content; and
    writing the service level to the memory.

5. The method of claim 1, wherein the modified header comprises a modification including at least one of a service level label in media feature tags, a language replacement using an accept-language header, and a header replacement of any header.

6. The method of claim 5, wherein the modified header further comprises:
    the modification including the service level label, wherein the service level label is selected from a group comprising normal, static, mobile and dynamic, and wherein the normal is a default selection, the static is associated with easily-cached static objects, the mobile is associated with lightweight mobile clients and dynamic is associated with providing all content and features to the client.

7. The method of claim 1, further comprising:
receiving, at the one of the devices, the request with the modified header;
decoding the modified header;
fetching a variant of the web content specified in the modified header; and
serving the variant of the web content to the client.

8. The method of claim 1, wherein modifying the header in the request is performed by a layer 7 load balancer that receives the request from the client further comprises:
identifying the service level in a mapping table maintained in a service policy indicating a correspondence between the combined load level and the respective service level.

9. A computer program product for delivering web content to a client responsive to a request from the client, the computer program product comprising:
a computer readable storage device;
first program instructions to collect utilization metrics from a plurality of devices delivering web content to end users;
second program instructions to determine, individual load levels for each device in the plurality of devices based on respective utilization metrics of the devices, by;
first program sub-instructions to apply a device policy to the respective utilization metrics of each device in the plurality of devices by assigning, based on respective values of the respective utilization metrics, a weight value to each respective utilization metric;
second program sub-instructions to determine the individual load levels for each device in the plurality of devices based on weight values and a threshold level specified in the device policy, wherein the threshold level in the device policy specifies one of a highest assigned weight value, a lowest assigned weight value, or an average of assigned weight values of the respective utilization metrics; and
third program sub-instructions to write the individual load levels to a memory;
third program instructions to determine a combined load level of two or more of the devices, in the plurality of devices, of a same device type based on the individual load levels for the two or more of the devices in a subset of devices in the plurality of devices;
fourth program instructions to determine a service level to provide to the client based on the combined load level;
fifth program instructions responsive to receiving the request from the client to modify, by a layer 7 load balancer, a header in the request to specify a rate to deliver the web content to the client, based on a determined service level, by:
first program sub-instructions to read the determined service level from the memory;
second program sub-instructions to generate, using a transparent content negotiation protocol, a modified header based on the determined service level, wherein the modified header specifies a variant of the web content to deliver to the client; and
third program sub-instructions to insert the modified header into the request; and sixth program instructions to send the request with the modified header to one of the devices, wherein the one of the devices is directed to deliver the web content to the client at a specified rate, wherein the first, second, third, fourth, fifth, and sixth program instructions are stored on the computer readable storage device.

10. The computer program product of claim 9, wherein the third program instructions to determine a combined load level of the two or more of the devices of a same device type based on the individual load levels for the two or more respective of the devices further comprises:
first program sub-instructions to apply a type policy to the individual load levels determined for the two or more respective of the devices by assigning, based on a value of the individual load levels, a weight value to each individual load level;
second program sub-instructions to determine the combined load level for the two or more respective of the devices based on weight values of the individual load levels and a threshold level specified in the type policy, wherein the threshold level in the type policy specifies one of a highest assigned weight value, a lowest assigned weight value, or an average of the assigned weight values of the device individual load levels; and
third program sub-instructions to write the combined load level to the memory.

11. The computer program product of claim 10, wherein the fourth program instructions to determine a service level to provide to the client based on the combined load level further comprises:
first program sub-instructions to apply a service policy to the combined load level determined for the two or more respective of the devices to specify, based on a value of the combined load level, the service level indicating a variant of the web content; and
second program sub-instructions to write the service level to the memory.

12. The computer program product of claim 9, wherein the modified header comprises a modification including at least one of a service level label in media feature tags, a language replacement using an accept-language header, and a header replacement of any header.

13. The computer program product of claim 9, further comprising:
seventh program instructions to receive, at the one of the devices, the request with the modified header;
eighth program instructions to decode the modified header;
ninth program instructions to fetch a variant of the web content specified in the modified header; and
tenth program instructions to serve the variant of the web content to the client, wherein the seventh, eighth, ninth, and tenth program instructions are stored on the computer readable storage device.

14. A computer system for managing web content responsive to a request from a client, the computer system comprising:
a processor, a computer readable memory, and a computer readable storage device; first program instructions to collect utilization metrics from a plurality of devices that deliver web content to end users;
second program instructions to determine a individual load levels for each device in the plurality of devices, respectively, based on respective utilization metrics of the devices by:
applying a device policy to the respective utilization metrics of each device in the plurality of devices by assigning, based on respective values of the respective utilization metrics, a weight value to each respective utilization metric;
determining the individual load levels for each device in the plurality of devices based on weight values and a threshold level specified in the device policy, wherein the threshold level in the device policy specifies one of a highest assigned weight value, a lowest assigned weight value, or an average of assigned weight values of the respective utilization metrics; and writing the individual load levels to a memory;

third program instructions to determine a combined load level of two or more of the devices, in the plurality of devices, of a same device type based on the individual load levels for two or more respective devices in a subset of devices in the plurality of devices;

fourth program instructions to determine a service level to provide to the client based on the combined load level;

fifth program instructions to modify, by a layer 7 load balancer, a header in the request from the client to specify a rate to deliver the web content to the client based on a determined service level, by:

reading the determined service level from the memory;

generating, using a transparent content negotiation protocol, a modified header based on the determined service level, wherein the modified header specifies a variant of the web content to deliver to the client; and inserting the modified header into the request; and sixth program instructions to send the request with the modified header to one of the devices, wherein the one of the devices is directed to deliver the web content to the client at a specified rate, wherein the first, second, third, fourth, fifth, and sixth program instructions are stored on the computer readable storage device.

15. The computer system of claim 14, wherein the computer system comprises a load balancer that performs the first, second, third, fourth, fifth, and sixth program instructions, and wherein the computer system comprises the two or more devices, wherein the one of the devices serves delivers the web content according to the determined service level to the client at the specified rate.

* * * * *